(12) United States Patent
Marusczyk et al.

(10) Patent No.: US 10,686,212 B2
(45) Date of Patent: Jun. 16, 2020

(54) COATED CATHODE ACTIVE MATERIAL FOR A BATTERY CELL

(71) Applicant: Robert Bosch GmbH, Stuttgart (DE)

(72) Inventors: Anika Marusczyk, Stuttgart (DE); Christine Engel, Vailhingen/Enz Ensingen (DE); Joerg Ziegler, Rutesheim (DE); Thomas Eckl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 15/760,511

(22) PCT Filed: Sep. 5, 2016

(86) PCT No.: PCT/EP2016/070807
§ 371 (c)(1),
(2) Date: Mar. 15, 2018

(87) PCT Pub. No.: WO2017/045944
PCT Pub. Date: Mar. 23, 2017

(65) Prior Publication Data
US 2018/0261880 A1 Sep. 13, 2018

(30) Foreign Application Priority Data
Sep. 16, 2015 (DE) .......................... 10 2015 217 749

(51) Int. Cl.
*H01M 10/00* (2006.01)
*H01M 10/0525* (2010.01)
(Continued)

(52) U.S. Cl.
CPC ....... *H01M 10/0525* (2013.01); *H01M 4/131* (2013.01); *H01M 4/1391* (2013.01);
(Continued)

(58) Field of Classification Search
CPC .... H01M 4/131; H01M 4/1391; H01M 4/366; H01M 10/0525; H01M 4/525; H01M 4/628; H01M 4/505
See application file for complete search history.

(56) References Cited

U.S. PATENT DOCUMENTS

| 6,936,377 B2 * | 8/2005 | Wensley | H01M 2/0207 235/380 |
| 2002/0061274 A1 * | 5/2002 | Hosoya | H01M 4/366 423/306 |

(Continued)

FOREIGN PATENT DOCUMENTS

| DE | 102012208321 A1 | 11/2013 |
| DE | 102012214119 A1 | 2/2014 |

(Continued)

OTHER PUBLICATIONS

International Search Report dated Jan. 13, 2017, of the corresponding International Application PCT/EP2016/070807 filed Sep. 5, 2016.

*Primary Examiner* — Cynthia H Kelly
*Assistant Examiner* — Monique M Wills
(74) *Attorney, Agent, or Firm* — Norton Rose Fulbright US LLP; Gerard A. Messina

(57) ABSTRACT

A cathode active material for a battery cell is described. A protective layer is at least partially applied to the cathode active material, and the protective layer is made of a lithium ion-conducting solid electrolyte layer.

22 Claims, 1 Drawing Sheet

(51) Int. Cl.
  *H01M 4/131* (2010.01)
  *H01M 4/1391* (2010.01)
  *H01M 4/36* (2006.01)
  *H01M 4/505* (2010.01)
  *H01M 4/525* (2010.01)
  *H01M 4/62* (2006.01)

(52) U.S. Cl.
  CPC .......... *H01M 4/366* (2013.01); *H01M 4/505* (2013.01); *H01M 4/525* (2013.01); *H01M 4/628* (2013.01)

(56) References Cited

U.S. PATENT DOCUMENTS

| | | | | |
|---|---|---|---|---|
| 2009/0029265 A1* | 1/2009 | Ota | ................ | H01M 10/052 429/322 |
| 2013/0224632 A1* | 8/2013 | Roumi | ................ | H01M 2/166 429/516 |
| 2013/0260209 A1 | 10/2013 | Hallac et al. | | |
| 2014/0099538 A1* | 4/2014 | Johnson | ................ | H01M 4/13 429/211 |
| 2014/0342209 A1* | 11/2014 | He | ................ | H01M 10/056 429/101 |
| 2015/0064537 A1 | 3/2015 | Christensen et al. | | |
| 2015/0099188 A1* | 4/2015 | Holme | ................ | C04B 35/6262 429/231.95 |
| 2015/0180037 A1 | 6/2015 | Gronwald et al. | | |
| 2016/0028114 A1* | 1/2016 | Pratt | ................ | H01M 2/1673 429/309 |
| 2016/0172706 A1* | 6/2016 | Xiao | ................ | H01M 4/13 429/189 |
| 2016/0315315 A1* | 10/2016 | Olken | ................ | C01G 45/1228 |
| 2016/0351973 A1* | 12/2016 | Albano | ................ | H01M 4/366 |

FOREIGN PATENT DOCUMENTS

| | | |
|---|---|---|
| DE | 102013204671 A1 | 9/2014 |
| DE | 102013216297 A1 | 2/2015 |
| DE | 102014111622 A1 | 2/2015 |
| DE | 102014213271 A1 | 1/2016 |
| WO | 2011/161019 A1 | 12/2011 |

\* cited by examiner

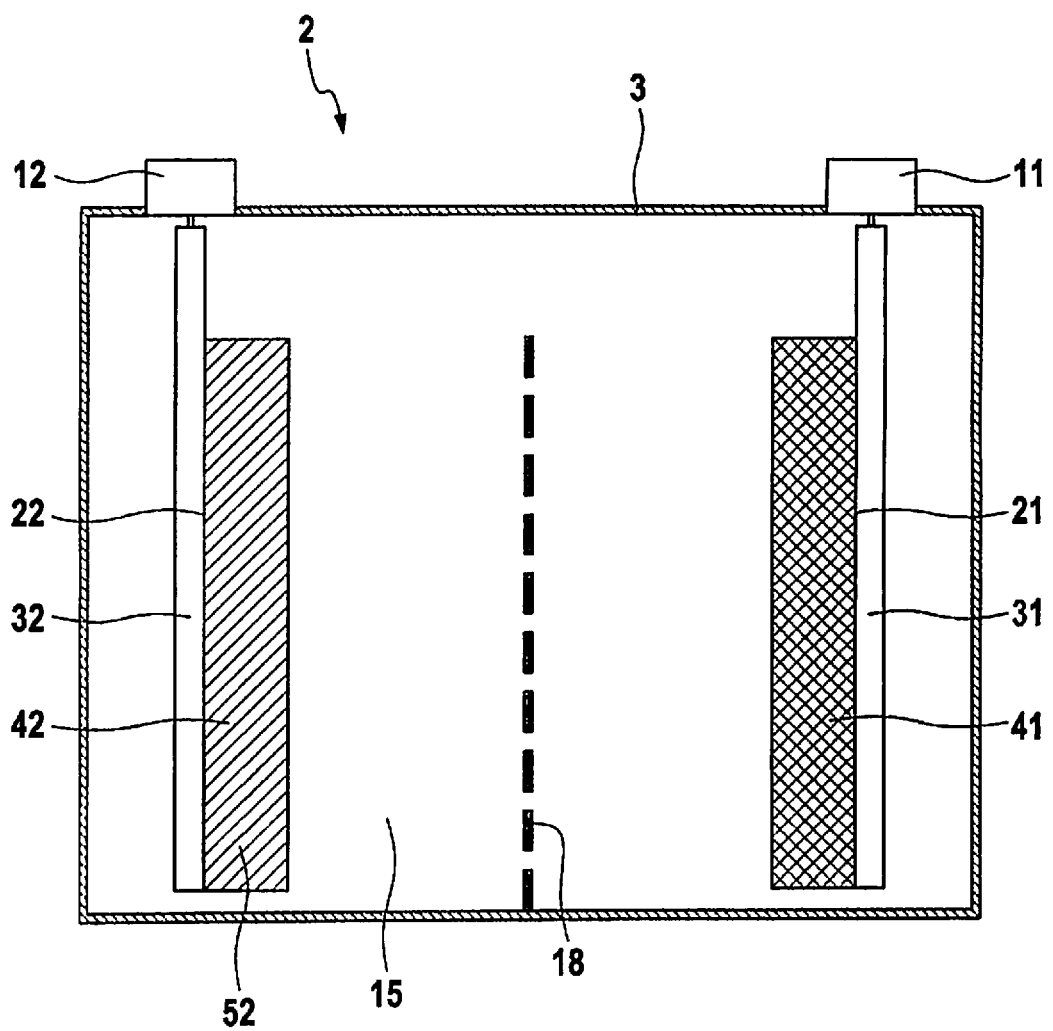

COATED CATHODE ACTIVE MATERIAL FOR A BATTERY CELL

FIELD

The present invention relates to the cathode active material for a battery cell, which includes a protective layer containing a lithium ion-conducting solid electrolyte. Moreover, the present invention relates to a battery cell that includes at least one electrode manufactured from the cathode active material, and a method for manufacturing the electrode according to the present invention.

BACKGROUND INFORMATION

The storage of electrical energy has become increasingly important in recent decades. Electrical energy may be stored with the aid of batteries. Batteries convert chemical reaction energy into electrical energy. A distinction is made between primary batteries and secondary batteries. Primary batteries are non-rechargeable, while secondary batteries, also referred to as accumulators, are rechargeable. A battery includes one or multiple battery cells.

In particular so-called lithium-ion battery cells are used in an accumulator. They are characterized, among other features, by high energy densities and an extremely low self-discharge.

Lithium-ion battery cells include a positive electrode (cathode) and a negative electrode (anode). The positive and negative electrodes each include a current collector, to which a positive or negative active material (cathode or anode active material) is applied. The positive and negative active material is characterized in particular in that it is capable of reversible intercalation and deintercalation of lithium ions.

The active material for the negative electrode (anode active material) is, for example, silicon which may form compounds with lithium atoms. However, carbon compounds such as graphite are also widely used as active material for negative electrodes. Lithium atoms are intercalated into the active material of the negative electrode in the charged state.

Lithium-containing transition metal oxides or lithium-containing transition metal phosphates which are able to reversibly intercalate and release lithium ions are generally used as active material for the positive electrode (cathode active material). In particular in applications in which a high energy density is necessary, so-called high-energy materials such as high-energy (HE) nickel-cobalt-manganese (NCM) electrodes (for example, x $LiMO_2 \cdot (1-x)$ $Li_2MnO_3$, where M=Ni, Co, Mn) are used. A generic battery that uses such an HE-NCM electrode is described in German Patent Application No. DE 10 2012 208 321 A1, for example.

During operation of the battery cell, i.e., during a discharging operation, electrons flow in an external circuit from the negative electrode to the positive electrode. During a discharging operation, lithium ions migrate from the negative electrode to the positive electrode within the battery cell. In the process, the lithium ions are reversibly deintercalated from the active material of the negative electrode, also referred to as delithiation. During a charging operation of the battery cell, the lithium ions migrate from the positive electrode to the negative electrode. In the process, the lithium ions are reversibly reintercalated into the active material of the negative electrode, also referred to as lithiation.

The electrodes of the battery cell have a foil-like design and are wound to form an electrode winding, with a separator situated in between which separates the negative electrode from the positive electrode. Such an electrode winding is also referred to as a "jelly roll." The electrodes may also be layered one above the other to form an electrode stack.

The two electrodes of the electrode winding or of the electrode stack are electrically connected with the aid of collectors to poles of the battery cell, also referred to as terminals. A battery cell includes an electrode winding or electrode stack.

The electrodes and the separator are surrounded by an electrolyte which is generally liquid. The electrolyte is conductive for the lithium ions, and allows transport of the lithium ions between the electrodes.

U.S. Patent Appl. No. 2015/0064537 A1 describes a lithium-ion battery that includes a positive electrode, a negative electrode, and a solid electrolyte situated between these electrodes, the solid electrolyte being provided with a protective layer on at least the surface facing the positive electrode. The protective layer is used to prevent electrical contact of the electrodes with the electrolyte. A material that includes $Al_2O_3$ and $Si_3N_4$ is provided for the protective layer.

German Patent Application No. DE 10 2013 204 671 A1 describes an electrode for an electrochemical energy store, including a layer of an active material, and a protective layer which is at least partially applied to the active material and which includes a material based on fluorophosphate.

Conventional electrodes use active materials that frequently enter into reactions upon contact with the electrolyte under the operating conditions of the lithium-ion cells. This may result in changes in the active material and in the electrolyte. In particular at high voltages, for example at voltages ≥4.3 V, this may result in changes in the active material of the electrode (in particular the positive electrode) and in the electrolyte (oxidation of the electrolyte at the cathode active material). The operation of the cell thus results in a loss of the capacity of the cell (so-called "capacity fade") and an increase in the internal resistance of the cell. The object of the present invention, therefore, is to provide an electrode having a preferably constant capacity and internal resistance, even after a long service time of the cell.

SUMMARY

A cathode active material for an electrode of a battery cell, in particular for a lithium-ion battery cell, is provided, the active material being provided with a protective layer.

According to the present invention, the protective layer is made of a lithium ion-conducting solid electrolyte that includes at least one of the following compounds a) through j):

a) $LiTiCoO_4$ (lithium-titanium-cobalt oxide);
b) LiPON (lithium phosphorus oxynitride) or $Li_3PO_4$ (lithium phosphate);
c) $LiFePO_4$ (lithium-iron phosphate);
d) $Li_4Ti_5O_{12}$ (lithium titanate);
e) garnets of general formula $Li_yA_3B_2O_{12}$ in a predominantly cubic crystal structure, where A is selected from at least one element of the group La, K, Mg, Ca, Sr, and Ba, B is selected from at least one element of the group Zr, Hf, Nb, Ta, W, In, Sn, Sb, Bi, and Te, and 3<y<7. A predominantly cubic crystal structure is a crystal structure for which at least 80 vol % is made up of a cubic crystal structure. Particularly preferred are garnets of formula $Li_yA_3B_2O_{12}$, where A=La, and B is selected from Zr, Nb, Ta, and Te. One preferred specific embodiment is garnets of general formula $Li_{7-x}La_3Zr_{2-x}M_xO_{12}$, where M stands for Nb, Ta, or a mixture of the two elements, and $2\geq x\geq 0$, in particular $1.5\geq x\geq 0.5$. Another preferred specific embodiment is garnets of general formula $Li_{7-3z}Al_zLa_3Zr_{2-x}M_xO_{12}$, where M stands for Nb, Ta, or a mixture of the two elements, $2\geq x\geq 0$, in particular $1.5\geq x\geq 0.5$, and $0<z<0.3$;

f) perovskites of general formula $Li_{3x}La_{2/3-x}TiO_3$, where $2/3\geq x\geq 0$, in particular $0.5\geq x\geq 0.2$;

g) compounds of the NASICON type, represented by general formula $Li_{1+x}R_xM_{2-x}(PO_4)_3$, where M is selected from at least one element of the group Ti, Ge, and Hf, R is selected from at least one element of the group Al, B, Sn, and Ge, and $0\leq x<2$. In one specific embodiment x=0. In one preferred specific embodiment M=Ti. One preferred specific embodiment is a compound of general formula $Li_{1+x}Al_xGe_yTi_{2-x-y}(PO_4)_3$, where $0\leq x\leq 2$, $0\leq y\leq 2$, and $0\leq x+y<2$; it is particularly preferred that $0<x\leq 1$, $0<y\leq 1$, and $0<x+y<2$;

h) lithium-ion-conducting sulfidic glasses of general formula $x \cdot (Li_2S) \cdot y \ (P_2S_5) \cdot z \ (M_nS_m)$, where $M_nS_m$ has the meaning $SnS_2$, $GeS_2$, $B_2S_3$, or $SiS_2$, and x, y, and z may each independently assume a value of 0 to 100, with the condition that x+y+z=100. One preferred specific embodiment is sulfidic glasses where $60\leq x\leq 90$, $30\leq y\leq 60$, and z=0. It is particularly preferred that x=70, y=30, and z=0. Further preferred specific embodiments are sulfidic glasses having the composition $x \ (Li_2S) \cdot (P_2S_5) \cdot z \ (GeS_2)$, where y=z=14 and x=72;

i) argyrodites of formula $Li_6PS_5X$, where X may be selected from Cl, Br, and I; preferred specific embodiments are $Li_6PS_5Cl$ and $Li_6PS_5Br$; $Li_6PS_5Cl$ is particularly preferred;

j) polymer electrolytes based on polyethylene oxide (PEO); for increasing the lithium ion conductivity, the polymer electrolytes preferably include lithium salts selected from lithium hexafluorophosphate ($LiPF_6$), lithium tetrafluoroborate ($LiBF_4$), $LiSbF_6$, $LiAsF_6$, $Li(CF_3)SO_2NSO_2(CF_3)$ (LiTFSI), $LiClO_4$, lithium bis(oxalato)borate ($Li[B(C_2O_4)_2]$, LiBOB), and/or lithium difluoro(oxalato)borate ($Li[BF_2(C_2O_4)]$, LiDFOB).

The active material is preferably provided all over with a thin, uniform layer of the lithium ion-conducting solid electrolyte. The layer thickness is preferably less than 15 nm, in particular less than 10 nm. If the layer thickness is too great, the resistance of the active material on which the protective layer is applied, and thus also the internal resistance of the cell, increases. At the same time, if the coating is too thick, the energy density of the battery cell is reduced due to the intrinsic weight of the coating, since the coating material does not contribute to the capacity of the cell.

The active material may generally be any active material available to those skilled in the art. The coating according to the present invention is particularly advantageous in combination with active materials for positive electrodes for battery cells, which at high voltages of 4.3 V and greater, for example, tend to enter into redox reactions with the other components contained in the battery cell, in particular the electrolyte. This is the case in particular for active materials for positive electrodes of lithium-ion battery cells of general formula $LiMO_2$, where M is selected from Co, Ni, Mn, or mixtures thereof or mixtures thereof with Al. In one preferred specific embodiment, the positive active material is a material that includes nickel, i.e., $LiNi_{1-x}M'xO_2$, where M' is selected from Co, Mn, Al and mixtures thereof, and $0<x<1$. Particularly preferred are compounds in which M' stands for mixtures of Co and Al or for mixtures of Co and Mn. Examples include lithium-nickel-cobalt-aluminum oxides (for example, $LiNi_{0.8}Co_{0.15}Al_{0.05}O_2$; NCA) and lithium-nickel-manganese-cobalt oxides (for example, $LiNi_{0.8}Mn_{0.1}Co_{0.1}O_2$; NCM (811) or $LiNi_{0.33}Mn_{0.33}Co_{0.33}O_2$; NCM (111)). The active material may also include a superlithiated, so-called high-energy (HE) material of general formula n $(LiNi_{1-x}M'_xO_2) \cdot 1-n$ $(Li_2MnO_3)$, where M' represents metal ions selected from Co, Mn, and mixtures thereof, and $0<n<1$ and $0<x<1$. These materials are referred to as HE-NCM, and are characterized in that in that they have a particularly high specific capacity.

The coating may be applied to the active material as such, for example to active material in the form of particles. These particles preferably have a diameter in a range of $\geq 2$ μm to $\geq 15$ μm. For the manufacture of the electrodes, the active material may be mixed with additional components that improve the properties of the active material. At least one conductive additive and/or at least one binder is preferably added to the active material. Any material known to those skilled in the art may be used as conductive additive, in particular carbon compounds such as graphite or conductive carbon black. In particular polymers, for example styrene-butadiene copolymer (SBR), polyvinylidene fluoride (PVDF), polytetrafluoroethene (PTFE), and ethylene propylene diene terpolymer (EPDM), are suited as binder.

Moreover, an electrode for a battery cell, in particular a cathode for a lithium-ion battery cell, is provided which includes the cathode active material according to the present invention provided with a protective layer, and at least one current collector.

The service life of battery cells, in particular battery cells containing NCA or NCM or HE-NCM active material, may be increased by coating according to the present invention of the active material of an electrode with a lithium ion-conducting material. It is known from tests with HE-NCM that for this purpose, this material tends to oxidize organic components of the electrolyte at the surface of the positive active material (cathode active material). As a result, these components of the electrolyte are decomposed and the internal resistance of the battery cells increases. In addition, transition metal ions are dissolved from the positive active material and migrate through the electrolyte to the negative electrode, where they are redeposited. The so-called solid electrolyte interface, which is important for the cell chemistry of the battery, is thus destroyed at the negative electrode. This results in consumption of recyclable lithium, and the cell shows a loss in capacity.

The protective layer according to the present invention suppresses direct contact of the surface of the active material with the electrolyte, and thus prevents or reduces the described problems. At the same time, the lithium ions may pass through the protective layer largely unhindered, since it is made of material that is conductive for lithium ions. In contrast, transition metal ions are not able to pass through the protective layer. Therefore, they cannot be dissolved from the active material and enter into the electrolyte.

A battery cell is also provided which includes at least one electrode according to the present invention, preferably a positive electrode (cathode), that includes the coated cathode active material according to the present invention.

In addition, the battery cell includes at least one negative electrode, and at least one separator that are situated between the negative electrode and the positive electrode. The task of the separator is to protect the electrodes from direct contact with one another and thus prevent a short circuit. At the same time, the separator must ensure the transfer of the ions from one electrode to the other. It is therefore important that the separator is electrically nonconductive, but has a preferably high ion conductivity, in particular with respect to lithium ions. Suitable materials are in particular polymers such as polyolefins, polyesters, and fluorinated polymers. Particularly preferred polymers are polyethylene (PE), polypropylene (PP), polyethylene terephthalate (PET), polytetrafluoroethene (PTFE), and polyvinylidene fluoride (PVDF).

Lastly, the battery cell includes an electrolyte which allows the transport of the lithium ions from one electrode to the other. This transport generally takes place in the form of lithium ion transport. Electrolytes that allow preferably unhindered transport of the lithium ions are thus preferred.

Suitable electrolytes preferably include at least one anhydrous aprotic solvent and at least one lithium salt. Suitable solvents are in particular organic carbonates. A mixture of at least one cyclic carbonate and at least one linear carbonate is preferably used as solvent. Ethylene carbonate (EC), propylene carbonate (PC), and butylene carbonate (BC) are named as examples of cyclic carbonates. Preferred linear carbonates are dimethylene carbonate (DMC), diethyl carbonate (DEC), and ethylmethyl carbonate (EMC). All lithium salts that assist with the transfer of lithium ions between the electrodes are suitable salts. Examples include $LiPF_6$, $LiBF_4$, $LiSbF_6$, $LiAsF_6$, $LiC_4F_9SO_3$, $LiClO_4$, $Li[B(C_2O_4)_2]$ and $Li[BF_2(C_2O_4)]$, and $Li(CF_3)SO_2NSO_2(CF_3)$.

The battery cell thus obtained may be used as an energy store after forming. The forming of the battery cell takes place by applying a defined voltage to the battery cell for the first time, a defined current flowing through the battery cell for the first time. Such a method for forming a battery cell, in which formation currents for activating electrochemical processes in the battery cell are applied, is described in German Patent Application No. DE 10 2012 214 119 A1, for example.

A further subject matter of the present invention relates to a method for manufacturing an electrode for a battery cell, in particular an electrode designed as described above, the method including the following method steps:

(i) providing a cathode active material;
(ii) providing the cathode active material with a protective layer, the protective layer being made of a lithium ion-conducting solid electrolyte that includes at least one of compounds a) through j) defined above;
(iii) optionally adding a conductive additive;
(iv) optionally adding a binder;
(v) assembling a current collector with the mixture produced in steps (i) through (iv); and
(vi) optionally compacting the manufactured electrode.

The above definitions and preferred specific embodiments apply with regard to compounds a) through j).

In particular, an electrode for a battery cell may be manufactured with such a method. This battery cell may in particular have the advantages described for the electrode. In summary, such a battery cell may result in advantages with regard to the long-term stability of the electrodes, such as the positive electrode in particular, and also with regard to the electrochemical properties of the electrodes.

The method includes initially providing a cathode active material in method step (i). The above definitions, limitations, and preferred specific embodiments apply with regard to the selection of the active material. For example, the active material may be an HE-NCM material of chemical formula n $LiNi_{1-x}M'_xO_2 \cdot (1-n)$ $Li_2MnO_3$, where M' represents metal ions selected from Co, Mn, and mixtures thereof, and $0<n<1$ and $0<x<1$. The active material may particularly preferably be present in the form of particles.

An at least partial, preferably a complete, coating of the active material with a protective layer subsequently takes place according to method step (ii), the protective layer being made of a lithium ion-conducting solid electrolyte that includes at least one of compounds a) through j) defined above.

The coating may take place using any method known to those skilled in the art that is suitable for coating active materials for electrodes. Particularly suitable are methods that allow a preferably thin coating, preferably having a layer thickness of less than 15 nm, in particular less than 10 nm. The coating may take place with the aid of physical, wet chemical, or mechanical methods. Suitable physical methods are in particular atomic layer deposition (ALD) and nebulized spray pyrolysis. Mechanical methods include dip coating or mechanical grinding of the coating. Wet chemical methods include in particular so-called sol-gel methods or applications from slurries or solutions with subsequent drying and/or sintering steps.

The coating preferably takes place directly on the particles of the active material before they are combined with the other components such as binder and conductive additives and processed to form a layer. The production of active material particles is basically conventional to those skilled in the art, and may take place, for example, by agglomeration directly during the synthesis of the active material, for example during the coprecipitation of the particles in the reactor. Spherical particles having a low porosity and a diameter in a range of 2 μm to 15 μm are preferably used. In this way, fairly large particles of the active material may be produced prior to a coating to allow higher compaction during the electrode manufacture than with nanoparticulate material. This preferably results in a higher capacity per electrode volume.

A conductive additive may preferably be added to the active material in a further method step (iii). The conductive additive is used to improve the electrical conductivity of the active material. Suitable materials that may be used as conductive additives are known to those skilled in the art. For example, carbon compounds such as graphite or carbon black may be used, these materials being non-limiting.

In addition, a binder such as polyvinylidene fluoride (PVDF) may preferably be added according to method step (iv) in order to improve in particular the mechanical stability of the electrode and its adhesion to the current collector.

The active material or electrode material obtained in steps (i) through (iv) is applied to a current collector in a further method step (v). This may be achievable, for example, in a conventional manner by applying, for example by doctoring, the active material mixture to the current collector, such as a metallic foil.

The electrode manufactured in method step (v) may also be compacted according to method step (vi) if this appears to be necessary or advantageous. This may take place with application of pressure, for example in a calendar. For example, elevated temperatures, for example in a range of 120° C., may be used.

A battery cell according to the present invention is advantageously used in an electric vehicle (EV), in a hybrid vehicle (HEV), in a plug-in hybrid vehicle (PHEV), in a tool, or in a consumer electronic product. Tools are understood in particular to mean tools for home use and garden tools. Consumer electronic products are understood in particular to mean mobile telephones, tablet PCs, or notebooks It is possible to increase the service life of battery cells by coating at least a portion of the surface of the cathode active material of an electrode with a lithium ion-conducting solid electrolyte. This effect may be achieved in particular when the active material is a cathode active material that includes at least one NCA, NCM, or HE-NCM compound. The improvement of the service life is achieved in that coating the surface of the active material with a lithium ion-conducting solid electrolyte reduces or prevents direct contact between the active material and the electrolyte, so that the occurrence of reactions between these two components is also reduced or prevented. This results in a reduction in the oxidation of the electrolyte, and the dissolving of transition metals from the active material is also effectively reduced. In turn, the lithium ions are also able to pass through the protective layer and become intercalated in the active material or be released from the active material, since they may pass through the solid electrolyte layer largely unhindered. Thus, no undesirable side reactions of the active material with the electrolyte take place during operation. The active material and thus also the internal resistance and the cell capacity therefore remain stable over a relatively long time period and a large number of cycles. The service life of the battery is thus increased, thus enabling commercial use in particular of lithium-ion batteries with an NCA, NCM, or HE-NCM compound in active material of the positive electrode.

BRIEF DESCRIPTION OF THE DRAWING

Specific embodiments of the present invention are explained in greater detail below with reference to the FIGURE.

FIG. 1 shows a schematic illustration of a battery cell.

DETAILED DESCRIPTION OF EXAMPLE EMBODIMENTS

A battery cell 2 is schematically illustrated in FIG. 1. Battery cell 2 includes a cell housing 3 having a prismatic design, in the present case a cuboidal design. In the present case, cell housing 3 has an electrically conductive design and is made of aluminum, for example. However, cell housing 3 may also be made of an electrically insulating material, for example plastic.

Battery cell 2 includes a negative terminal 11 and a positive terminal 12. A voltage provided by battery cell 2 may be tapped via terminals 11, 12. In addition, battery cell 2 may also be charged via terminals 11, 12. Terminals 11, 12 are situated spaced apart from one another on a top surface of prismatic cell housing 3.

An electrode winding which includes two electrodes, namely, a negative electrode (anode) 21 and a positive electrode (cathode) 22, is situated within cell housing 3 of battery cell 2. Negative electrode 21 and positive electrode 22 each have a foil-like design, and are wound to form an electrode winding with a separator 18 situated in between. It is also possible to provide multiple electrode windings in cell housing 3. An electrode stack, for example, may also be provided instead of the electrode winding.

Negative electrode 21 includes a negative active material (anode active material) 41 which has a foil-like design. Anode active material 41 contains graphite and/or silicon or a silicon-containing alloy as the base material. Negative electrode (anode) 21 also includes a current collector 31, which likewise has a foil-like design. Anode active material 41 and current collector 31 are placed flatly against one another and joined together. Current collector 31 of negative electrode 21 has an electrically conductive design and is made of a metal, for example copper. Current collector 31 of negative electrode 21 is electrically connected to negative terminal 11 of battery cell 2.

In the present case, positive electrode or cathode 22 is a high-energy (HE) nickel-cobalt-manganese (NCM) electrode. Positive electrode 22 includes a positive active material (cathode active material) 42 which is present in particle form. Additives, in particular conductive carbon black and binder, are situated between the particles of cathode active material 42. Cathode active material 42 and the additives form a composite which has a foil-like design. A protective layer 52 is applied to the particles of cathode active material 42. The particles of cathode active material 42 are enclosed by protective layer 52. Protective layer 52 thus envelops the particles of cathode active material 42. Protective layer 52 contains primarily $LiTiCoO_4$. Protective layer 52 prevents or reduces contact of cathode active material 42 with electrolyte 15 contained in cell housing 3 of battery cell 2. Elutriation of transition metals from cathode active material 42 and migration of elutriated transition metals to negative electrode 21 of battery cell 2 are likewise prevented or reduced.

Positive electrode 22 also includes a current collector 32 which likewise has a foil-like design. The composite, made up of cathode active material 42 and the additives, and current collector 32 are placed flatly against one another and joined together. Current collector 32 of positive electrode 22 has an electrically conductive design and is made of a metal, for example aluminum. Current collector 32 of positive electrode 22 is electrically connected to positive terminal 12 of battery cell 2.

Negative electrode 21 and positive electrode 22 are separated from one another by separator 18. Separator 18 likewise has a foil-like design. Separator 18 has an electronically insulating design, but is ionically conductive, i.e., is permeable for lithium ions.

Cell housing 3 of battery cell 2 is filled with a liquid aprotic electrolyte 15 or with a polymer electrolyte. Electrolyte 15 surrounds negative electrode 21, positive electrode 22, and separator 18. Electrolyte 15 is also ionically conductive.

The present invention is not limited to the exemplary embodiments described here and the aspects highlighted therein. Rather, numerous modifications within the range set forth in the claims are possible which are within the scope of activities carried out by those skilled in the art.

What is claimed is:

1. A cathode active material for a cathode of a lithium ion battery, the cathode active material being provided, at least in part, with a protective layer, wherein the protective layer is made of a lithium ion-conducting solid electrolyte layer that includes at least one of the following compounds:
   a) $LiTiCoO_4$ (lithium-titanium-cobalt oxide); and
   b) argyrodites of formula $Li_6PS_5X$, where X is selected from Cl, Br, and I.

2. The cathode active material as recited in claim 1, wherein a thickness of the protective layer made of the lithium ion-conducting solid electrolyte is less than 15 nm.

3. The cathode active material as recited in claim 1, wherein the cathode active material includes a compound of formula $LiMO_2$, where M is selected from Co, Ni, Mn or mixtures thereof or mixtures thereof with Al.

4. The cathode active material as recited in claim 1, wherein the cathode active material includes a compound of formula n $LiNi_{1-x}M'_xO_2 \cdot (1-n) Li_2MnO_3$, where M' represents metal ions selected from Co, Mn, and mixtures thereof, $0<n<1$, and $0<x<1$.

5. A cathode for a lithium-ion battery, including at least one cathode active material, the cathode active material being provided, at least in part, with a protective layer, wherein the protective layer is made of a lithium ion-conducting solid electrolyte layer that includes at least one of the following compounds:
   a) $LiTiCoO_4$ (lithium-titanium-cobalt oxide); and
   b) argyrodites of formula $Li_6PS_5X$, where X is selected from Cl, Br, and I.

6. A battery cell that includes at least one cathode, the cathode including at least one cathode active material, the cathode active material being provided, at least in part, with a protective layer, wherein the protective layer is made of a lithium ion-conducting solid electrolyte layer that includes at least one of the following compounds:
   a) $LiTiCoO_4$ (lithium-titanium-cobalt oxide); and
   argyrodites of formula $Li_6PS_5X$, where X is selected from Cl, Br, and I.

7. A method for manufacturing an electrode of a battery cell, comprising:
   (i) providing a cathode active material;
   (ii) at least partially coating the cathode active material with a protective layer, the protective layer being made of a lithium ion-conducting solid electrolyte that includes at least one of the following compounds: (a) $LiTiCoO_4$ (lithium-titanium-cobalt oxide); and (b) argyrodites of formula $Li_6PS_5X$, where X is selected from Cl, Br, and I;
   (iii) assembling a current collector with a mixture produced in steps (i) and (ii).

8. The method as recited in claim 7, further comprising:
   (iv) adding a conductive additive to the cathode active material;
   (v) adding a binder to the cathode active material; and
   (vi) after the at least partially coating step, compacting the at least partially coated cathode active material.

9. The method as recited in claim 7, wherein for coating an active material, wherein the at least partially coating step is one of a physical method, a mechanical method, or a wet chemical method.

10. The method as recited in claim 9, wherein a thickness of the solid electrolyte layer is less than 15 nm.

11. The method as recited in claim 8, wherein the cathode active material is in the form of particles having a particle diameter in a range of $\geq 2$ μm to $\leq 15$ μm.

12. A method of using a solid electrolyte, the method comprising:
   coating at least a portion of a surface of a cathode active material of a cathode of a battery cell with a protective layer of the solid electrolyte, the solid electrolyte including at least one of the following compounds: (a) $LiTiCoO_4$ (lithium-titanium-cobalt oxide); and (b) argyrodites of formula $Li_6PS_5X$, where X is selected from Cl, Br, and I.

13. The cathode active material as recited in claim 1, wherein the lithium ion-conducting solid electrolyte layer of the protective layer includes the $LiTiCoO_4$ (lithium-titanium-cobalt oxide).

14. The cathode active material as recited in claim 1, wherein the lithium ion-conducting solid electrolyte layer of the protective layer includes the argyrodites of formula $Li_6PS_5X$, where X is selected from Cl, Br, and I.

15. The cathode as recited in claim 5, wherein the lithium ion-conducting solid electrolyte layer of the protective layer includes the $LiTiCoO_4$ (lithium-titanium-cobalt oxide).

16. The cathode as recited in claim 5, wherein the lithium ion-conducting solid electrolyte layer of the protective layer includes the argyrodites of formula $Li_6PS_5X$, where X is selected from Cl, Br, and I.

17. The battery cell as recited in claim 6, wherein the lithium ion-conducting solid electrolyte layer of the protective layer includes the $LiTiCoO_4$ (lithium-titanium-cobalt oxide).

18. The battery cell as recited in claim 6, wherein the lithium ion-conducting solid electrolyte layer of the protective layer includes the argyrodites of formula $Li_6PS_5X$, where X is selected from Cl, Br, and I.

19. The method as recited in claim 7, wherein the lithium ion-conducting solid electrolyte layer of the protective layer includes the $LiTiCoO_4$ (lithium-titanium-cobalt oxide).

20. The method as recited in claim 7, wherein the lithium ion-conducting solid electrolyte layer of the protective layer includes the argyrodites of formula $Li_6PS_5X$, where X is selected from Cl, Br, and I.

21. The method as recited in claim 12, wherein the solid electrolyte includes the $LiTiCoO_4$ (lithium-titanium-cobalt oxide).

22. The method as recited in claim 12, wherein the solid electrolyte includes the argyrodites of formula $Li_6PS_5X$, where X is selected from Cl, Br, and I.

* * * * *